United States Patent
Salman et al.

(10) Patent No.: US 11,788,874 B1
(45) Date of Patent: Oct. 17, 2023

(54) SELF-POWERED, MATCHED WHEATSTONE BRIDGE FLOW SENSOR

(71) Applicant: KING FAISAL UNIVERSITY, Al-Ahsa (SA)

(72) Inventors: Saed Amin Salman, Al-Ahsa (SA); Mohd Al Saleh Al Othoum, Al-Ahsa (SA); Alaadeen Abuzir, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/144,724

(22) Filed: May 8, 2023

(51) Int. Cl.
  *G01F 1/69* (2006.01)
  *G01F 1/684* (2006.01)
  *G01F 1/696* (2006.01)

(52) U.S. Cl.
  CPC .............. *G01F 1/69* (2013.01); *G01F 1/6842* (2013.01); *G01F 1/696* (2013.01)

(58) Field of Classification Search
  CPC ........... G01F 1/69; G01F 1/6842; G01F 1/696
  See application file for complete search history.

(56) References Cited

U.S. PATENT DOCUMENTS

| | | | |
|---|---|---|---|
| 4,319,483 A | 3/1982 | Durham, Jr. et al. | |
| 5,404,753 A * | 4/1995 | Hecht | G01F 1/6845 73/204.22 |
| 5,533,412 A * | 7/1996 | Jerman | G01F 1/708 73/204.26 |
| 6,508,117 B1 | 1/2003 | Dubois et al. | |
| 7,054,767 B2 | 5/2006 | Eldridge | |
| 8,356,514 B2 | 1/2013 | Wang et al. | |
| 2002/0189342 A1 * | 12/2002 | Ishiguro | G01F 1/69 73/204.26 |
| 2022/0120701 A1 | 4/2022 | Udrea et al. | |

FOREIGN PATENT DOCUMENTS

| | | | |
|---|---|---|---|
| DE | 10358281 B4 | 11/2015 | |
| EP | 3104137 B1 | 9/2020 | |
| JP | 2008180739 A | 8/2008 | |

* cited by examiner

*Primary Examiner* — Herbert K Roberts
*Assistant Examiner* — Anthony W Megna Fuentes
(74) *Attorney, Agent, or Firm* — Nath, Goldberg & Meyer; Richard C. Litman

(57) ABSTRACT

A Wheatstone bridge flowmeter is provided with a flow channel on a top surface of the base substrate, with two resistors of the Wheatstone bridge in thermal communication with the flow channel. One resistor in the flow channel, on one side of the Wheatstone bridge, has a negative coefficient of resistance (NTC) and the other resistor in the flow channel, on the other side of the Wheatstone bridge, has a positive coefficient of resistance (PTC). At least two of the resistors in the Wheatstone bridge are mounted in at least one cavity space, so that one resistor on each side of the Wheatstone bridge is in thermal isolation from the flow channel, thereby allowing sensing of voltages across the Wheatstone bridge according to fluid flow through the flow channel.

10 Claims, 3 Drawing Sheets

US 11,788,874 B1

SELF-POWERED, MATCHED WHEATSTONE BRIDGE FLOW SENSOR

BACKGROUND

Technical Field

The present disclosure relates to a Wheatstone bridge solid state anemometer type flow sensor, using a flow channel etched in a semiconductor substrate.

Background Art

Wheatstone bridge flowmeters rely on changes resulting from flow across the Wheatstone bridge circuit. One technique is to use the Wheatstone bridge to sense temperature changes induced in a fluid as the fluid flows through a passage.

Sensors are used in a wide variety of applications. Some sensors include a heater resistor and/or one or more sensor resistors. Such sensors may include flow sensors, thermal conductivity sensors, chemical sensors, and/or other types of sensors. Under some circumstances, such sensors may become thermally unstable, which can affect their accuracy and/or reliability. By way of example, if a sensor includes a heater resistor that has a positive temperature coefficient of resistance, and is driven by a constant current source, the heater resistor may heat up, which may then cause the resistance of the heater resistor to further increase, which may cause the heater resistor to heat up further, and so on. This loop may cause damage to the heater resistor and/or the sensor more generally. Moreover, the use of a heater requires additional circuitry to supply power to a separate heater.

A typical sensor element for use in such meters is a Resistance Temperature Detector (RTD), the resistance of which is related to the temperature of the element itself. A typical bridge employs two RTD elements. One of the RTD elements is referred to as a temperature sensor element and is unheated. A flow sensor RTD element is heated and the effect of mass flow on the heated element provides a measure of the flow velocity of the fluid in a flow tube being monitored. The temperature of the fluid, such as a gas, flowing across the heated RTD is also a factor in the amount of heat dissipated from that RTD.

A number of common implementations of differential temperature sensors are configured with the temperature and flow sensors arranged as a Wheatstone bridge. The sensors are mounted in the fluid conduit and project into the flow path as an insertion flow sensor. The sensor elements are positioned to permit unobstructed flow fluid past both the flow sensor and the temperature sensor in such a way that one does not thermally influence the other. Consequentially, the temperature sensor must be a reference with respect to the fluid being sensed without influence from the heat of the flow sensor or the fluid heated by the heated sensor.

Calorimetric flow sensors usually consist of a heater surrounded by temperature sensitive elements arranged symmetrically downstream and upstream. A moving fluid will carry away heat in the direction of flow and accordingly change the temperature distribution around the heater. The temperature difference between upstream and downstream is measured by the temperature sensitive elements. The output signal is commonly fetched using a Wheatstone bridge circuit, in which a pair of downstream and upstream sensing elements comprises two of its four branches. The output signal, which is a measure of temperature difference, is proportional to the flow velocity. Many traditional thermal mass flow meters using capillary approach utilize this principle.

SUMMARY

According to the present subject matter, a Wheatstone bridge flowmeter is fabricated on a base substrate, with a flow channel formed on a top surface of the base substrate and a top cap fitted to the base substrate to form a fluid passageway. At least one relief cavity or cavity space is provided in at least one of the top surface of the base substrate and the top cap. A plurality of at least four resistors are mounted on the base substrate and connected as a Wheatstone bridge circuit. The resistors can have predetermined temperature coefficients of resistance, at least two of which are mounted on the base substrate across the flow channel or in thermal proximity to the flow channel and provide heating of the fluid. At least two of the Wheatstone bridge resistors can be mounted in said at least one cavity space. An output circuit can be used to sense voltages across the Wheatstone bridge to provide an output corresponding to fluid flow through the fluid passageway. Fluid flowing through the fluid passageway establishes thermal communication with said at least two of said at least four resistors mounted on the base substrate across the flow channel or in thermal proximity to the flow channel, thereby changing the output sensing voltages across the Wheatstone bridge according to fluid flow through the flow channel.

In one configuration, the two resistors mounted across the flow channel or in thermal proximity to the flow channel comprise at least one negative temperature coefficient of resistance (NTC) resistor and at least one positive temperature coefficient of resistance (PTC) resistor, and two of the resistors mounted on the base substrate in the cavity space comprise at least one negative temperature coefficient of resistance (NTC) resistor and at least one positive temperature coefficient of resistance (PTC) resistor. The coefficients of resistance of the NTC resistors substantially match in complement to the coefficients of resistance of the PTC resistors, such that a change in temperature results in equal-but-opposite changes in resistance between the NTC and PTC resistors.

DETAILED DESCRIPTION

Figure 1:
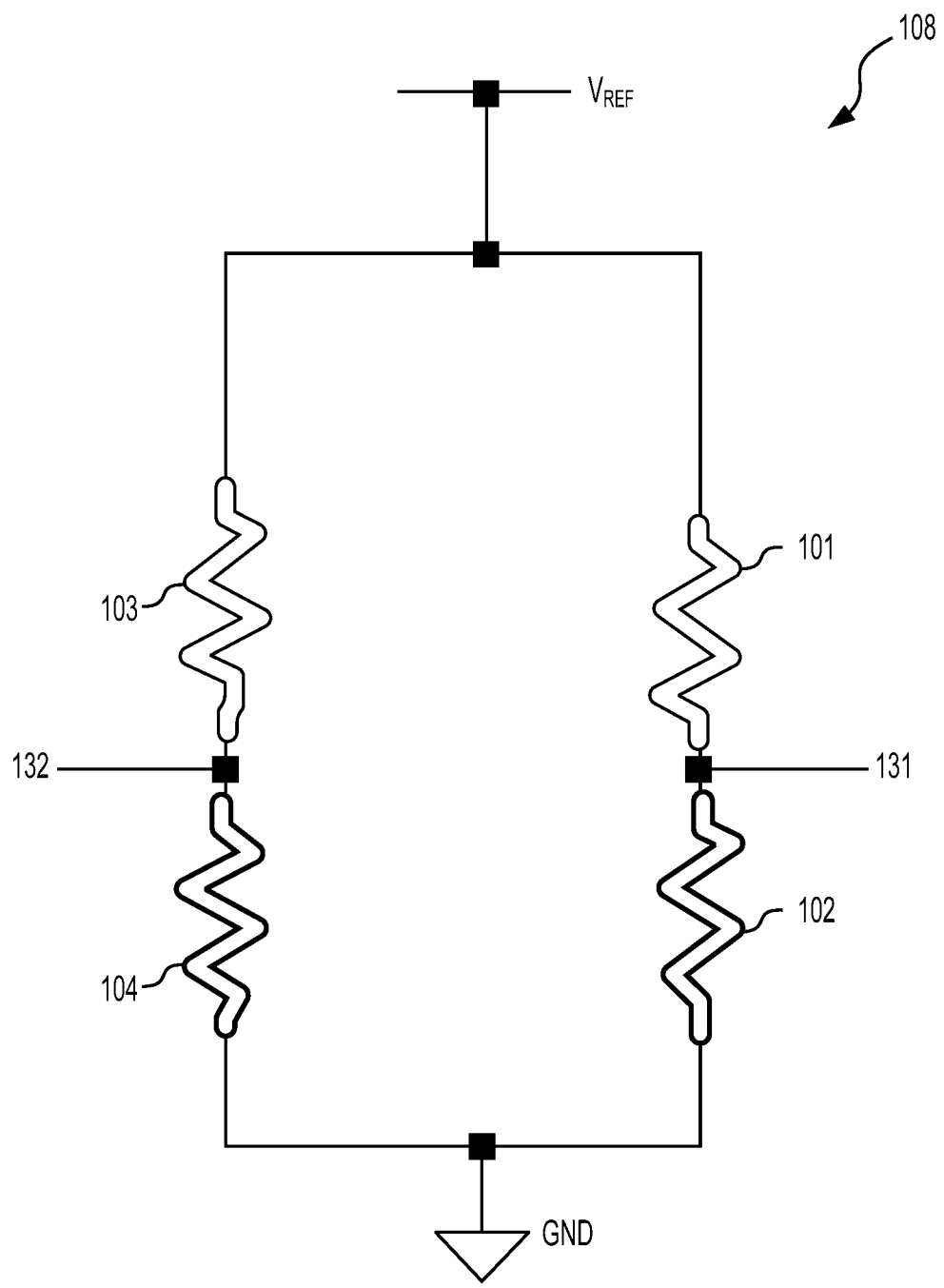
FIG. 1 is a schematic diagram showing a Wheatstone bridge sensor circuit using four resistors forming a Wheatstone bridge.

According to the present subject matter, a Wheatstone bridge solid state anemometer type flow sensor is implemented using a flow path etched in a semiconductor substrate and a top cap channel. The Wheatstone bridge can be arranged as one series pair of positive temperature coefficient (PTC) resistors, and one series pair of negative temperature coefficient (NTC) resistors, constituting the Wheatstone bridge. The NTC and PTC resistor combinations result in a higher sensor sensitivity.

In an embodiment, the present subject matter relates to a self-powered Wheatstone bridge in an anemometer-type flow sensor that operates without the requirement for an external heater. According to an embodiment, a substrate is provided with a flow path or channel etched into a semiconductor substrate with a flow inlet and a flow outlet at opposite sides of the flow path. The Wheatstone bridge may be fabricated on a thin membrane substrate using four resistors forming sensing elements. In certain embodiments, the four resistors of the Wheatstone bridge, for example formed as thin membrane resistors, can be mounted or formed on top of the substrate. The flow path can have a common top cap with a top cap flow path that aligns with the flow path in the base substrate to establish a fluid flow channel. Two of the resistors can be placed far apart across the flow path so as to sense thermal differences resulting from fluid flow. The other two resistors can be formed by two relief cavities, formed as reliefs in the substrate and isolated membrane structures, and which are enclosed in two different and large enough isolated cavities, isolated from the fluid flow channel.

The Wheatstone bridge sensing elements can have two positive temperature coefficient (PTC) and two negative temperature coefficient (NTC) resistors. A first side of the Wheatstone bridge comprises a first resistor as a PTC resistance, connected in series to a second resistor as an NTC resistance. A second side of the Wheatstone bridge comprises a third resistor as a PTC resistance, which is connected in series to a fourth resistor as an NTC resistance. The sequential order of the PTC and NTC resistances are given as non-limiting examples, and it is noted that these sequences can be inverted within the scope of the present subject matter.

Heat bubbles are induced around two of the resistors in a flow path, one of which is an NTC resistor and the other is a PTC resistor, with the resistors in the channel placed far apart such that they don't have significant thermal interaction. The remaining resistors also comprising one each of PTC and NTC resistors, can be in recesses or relief portions of the membrane substrate, separate from the flow channel. This arrangement allows the voltages to operate without additional heaters, so that the Wheatstone bridge is self-powered through resistances of the Wheatstone bridge. The arrangement may be provided on a monolithic integrated circuit substrate. This configuration provides an inherent balance of the sensing elements as a result of the PTC and NTC properties of the heating resistances and the sensing resistances.

A voltage reference can be connected to power the Wheatstone bridge. In an embodiment, the physical layout configuration can comprise or consist of Wheatstone bridge resistor structures which are placed on the flow channel (second and third resistors) and on the two isolated cavities (first and fourth resistors) to achieve the low thermal mass properties. This configuration enables high temperature operation and reduces the heat loss through the chip substrate to maximize the bridge sensitivity to fluid flow and achieve low power operation of the Wheatstone bridge. Based on the depicted schematic and the physical layout of the cavities formed as reliefs in the substrate structures, the Wheatstone bridge first and fourth resistors can operate in the same manner as the second and third resistors at initial power up.

If the cavities have volumes which are large enough to maintain the thermal isolation, as fluid flows the isothermally induced heat bubble around the second resistor (NTC) moves away, hence decreasing the temperature of the second resistor, hence increasing its resistance value which increases the voltage across the second resistor. On the other hand, the induced heat bubble around the third resistor (PTC) resistance moves away hence decreasing the third resistor temperature hence increasing its resistance value which causes the voltage value to decrease. The second resistor and the third resistor can be placed far apart such that they do not have any significant thermal interaction. On the other hand, the structures of the first resistor and the fourth resistor are thermally isolated in the two isolated cavities, and they have no interaction with the fluid flow. Hence, the voltage difference voltage can be significantly enhanced by the physical layout configuration.

Standard MEMS processes can be used to implement resistances and heater structures, and different polysilicon doping implants can be used to control TCRs of resistors. Alternatively, resistors can be bonded to the top of the lower substrate.

Features and advantages of the technique include a membrane type Wheatstone bridge having resistances that enhance the sensitivity span of an anemometer. The configuration reduces the needed power applied, by eliminating the use of a separate heater, and provides a higher dynamic range, using standard CMOS and MEMS integrated semiconductors to produce the PTC and NTC resistances in the Wheatstone bridge. Specific features include:

1. The use of a membrane type Wheatstone bridge with certain temperature coefficient resistances that can be achieved by different techniques to significantly enhance the sensitivity range of an anemometer type flow sensor at the manufacturing level without the need of extra signal processing components.
2. Reduced power requirements applied to heat the flow sensor.
3. The higher dynamic range of the analog signal at the output of Wheatstone bridge, and consequential lowered noise level than what may occur using digital processing.
4. Cost effective fabrication that requires standard CMOS and MEMS integrated semiconductor manufacturing techniques to realize the PTC and NTC of the Wheatstone bridge resistances.

In one embodiment, the disclosed technique implements an anemometer type flow sensor in the flow channel and etched in a semiconductor substrate and a top cap channel. The sensing elements comprise partially detached and suspended structures across the flow channel, which are electrically connected in Wheatstone bridge configuration in such a way as to maximize the sensitivity to fluid flow.

In an embodiment, the configuration involves two isolated cavities to maintain the balance of the Wheatstone bridge at the power up stage and the matching operation of Wheatstone bridge sensing elements. This presents a low power design that enhances the sensitivity of the disclosed self-powered Wheatstone bridge using two of its resistive elements with PTC and NTC properties.

This configuration does not require a separate heater, but rather relies on the self-powered Wheatstone bridge, with significantly enhanced sensitivity. The self-powered Wheatstone bridge resistor design with specific on-chip layout provides a configuration that eliminates the need for a discrete heater. This allows for a significant improvement of the sensor design sensitivity at the manufacturing level, which is cost effective since it reduces the need of extra signal processing techniques special for low flow levels. In the case of the use of polysilicon doped implants, the configuration can be implemented with ordinary CMOS and MEMS integrated semiconductor circuits to realize the PTC and NTC of the Wheatstone bridge resistors.

The present technique therefore involves the use of no extra heaters, and it comprises a self-powered Wheatstone bridge with enhanced sensitivity. It employs the disclosed self-powered Whetstone bridge resistance design PTC and NTC with a specific on chip layout configuration that eliminates the need for separate heaters. Relief cavities are introduced to maintain the balance of the Wheatstone bridge at the power up stage and the matching operation of the Wheatstone bridge.

FIG. 1 is a schematic diagram showing a Wheatstone bridge sensor circuit using four resistors 101, 102, 103, 104 forming Wheatstone bridge 108. Each side of Wheatstone bridge 108 has one PTC resistor and one NTC resistor. In the example depicted in FIG. 1, the sides are depicted as resistor 101 as a PTC resistor and resistor 102 as an NTC resistor on the right, and resistor 103 as a PTC resistor and resistor 104 as an NTC resistor on the left. As will be seen, one PTC resistor in a first leg (e.g., PTC resistor 103 in FIG. 2) and one NTC resistor in the second leg (e.g., NTC resistor 102 in FIG. 2) are used to sense fluid temperature, whereas the one NTC resistor in the first leg (e.g., NTC resistor 101 in FIG. 2) and one PTC resistor in the second leg (e.g., PTC resistor 104 in FIG. 2) are separated from the fluid flow. Wheatstone bridge 108 is supplied by voltage sources Vref and GND and has voltage sense points 131 and 132.

The "sides" of the Wheatstone bridge, as used in the present disclosure are the individual series circuits between voltage sources Vref and GND supplying the Wheatstone bridge. In that sense one side and the other side of the Wheatstone bridge is established by separate series connections between supply or reference voltage sources. In FIG. 1, resistors 101 and 102 are on one side and resistors 103 and 104 are on the other side.

Figure 2:
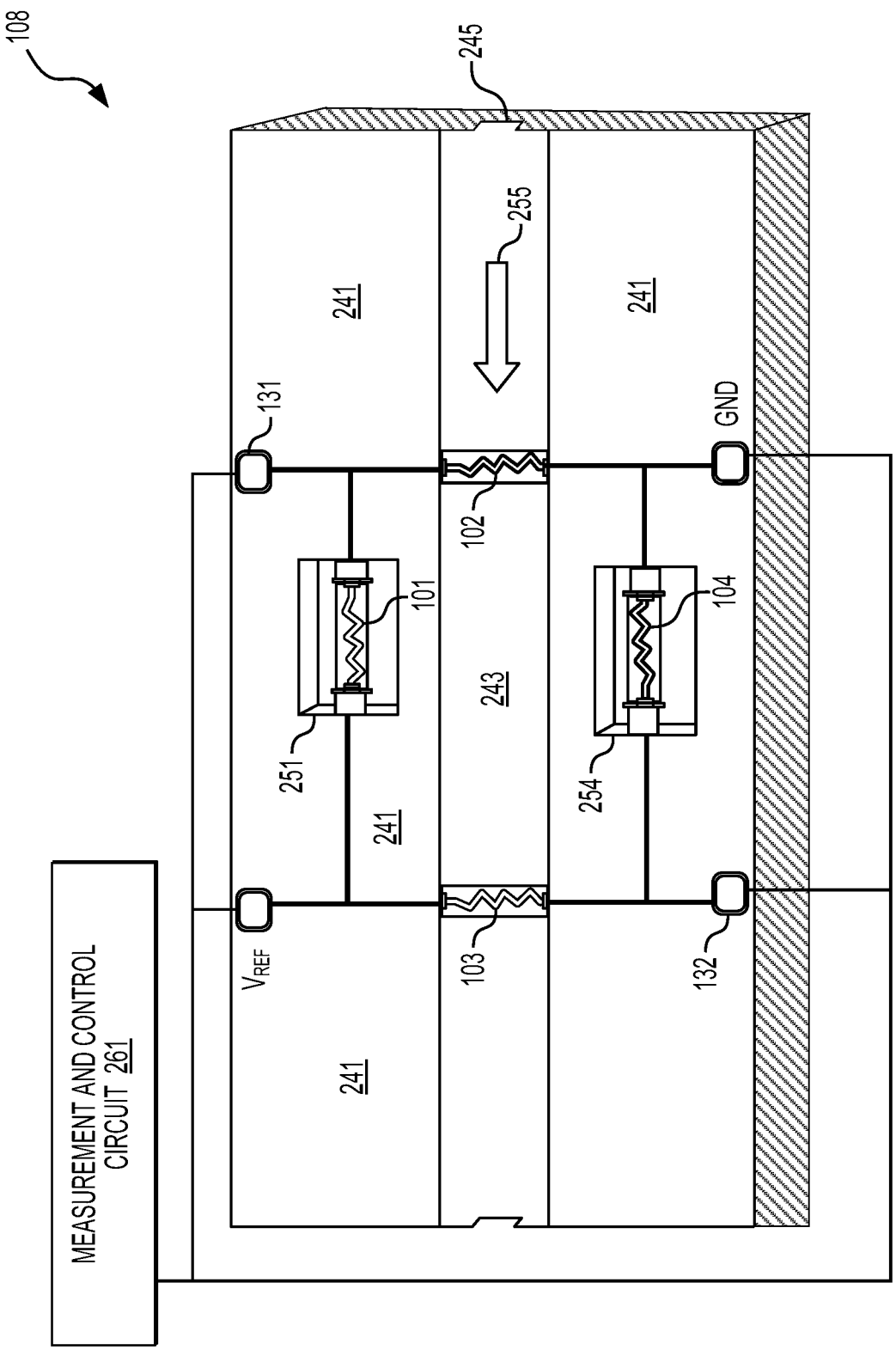
FIG. 2 is a schematic diagram showing the physical arrangement of the Wheatstone bridge of FIG. 1.

FIG. 2 is a schematic diagram showing the physical arrangement of the Wheatstone bridge of FIG. 1. Depicted is base substrate 241, which is a semiconductor chip substrate, through which flow channel 243 passes. In a non-limiting example, flow channel 243 may have a restriction orifice, such as flow inlet 245. Resistors 101, 102, 103, 104 are formed from base substrate 241 or are otherwise placed on base substrate 241, with two of the resistors 102, 103 positioned over flow channel 243 and the remaining two resistors 101, 104 placed separately from flow channel 243 in relief cavities 251, 254 provided in substrate 241. Therefore, the two resistors 102, 103 in flow channel 243 are exposed to flow channel 243, whereas the two resistors 101, 104 in relief cavities 251, 254 are isolated from the fluid flow, indicated by arrow 255. Measurement and control circuit 261 provides an indication of flow output based on the sensed difference between sense taps 131, 132. As a result of voltage applied to resistors 101, 102, 103, 104 by measurement and control circuit 261, resistors 101, 102, 103, 104 generate heat, which is used to determine fluid flow through flow channel 243 as described.

FIGS. 1 and 2 show PTC resistors 101 and 103 at the Vref end of Wheatstone bridge 108 and NTC resistors 102 and 10 at the GND end of Wheatstone bridge 108. It is also possible to reverse that configuration, so that NTC resistors are at the Vref end of Wheatstone bridge 108 and PTC resistors are at the GND end of Wheatstone bridge 108. Thus, in the disclosed example, the resistors on the first side and the resistors on the second side of the Wheatstone bridge have positions in series connections in the Wheatstone bridge that establish both of one PTC or NTC type resistors at one voltage end of the Wheatstone bridge (e.g., Vref in the example) and both of the other PTC or NTC type resistors at an opposite voltage end of the Wheatstone bridge (e.g., GND in the example). This structure allows base substrate 241 to be connected from all its sides, and the membrane may be formed, by way of non-limiting example, by a back etching process, which provides a more effective sensing structure.

Figure 3:
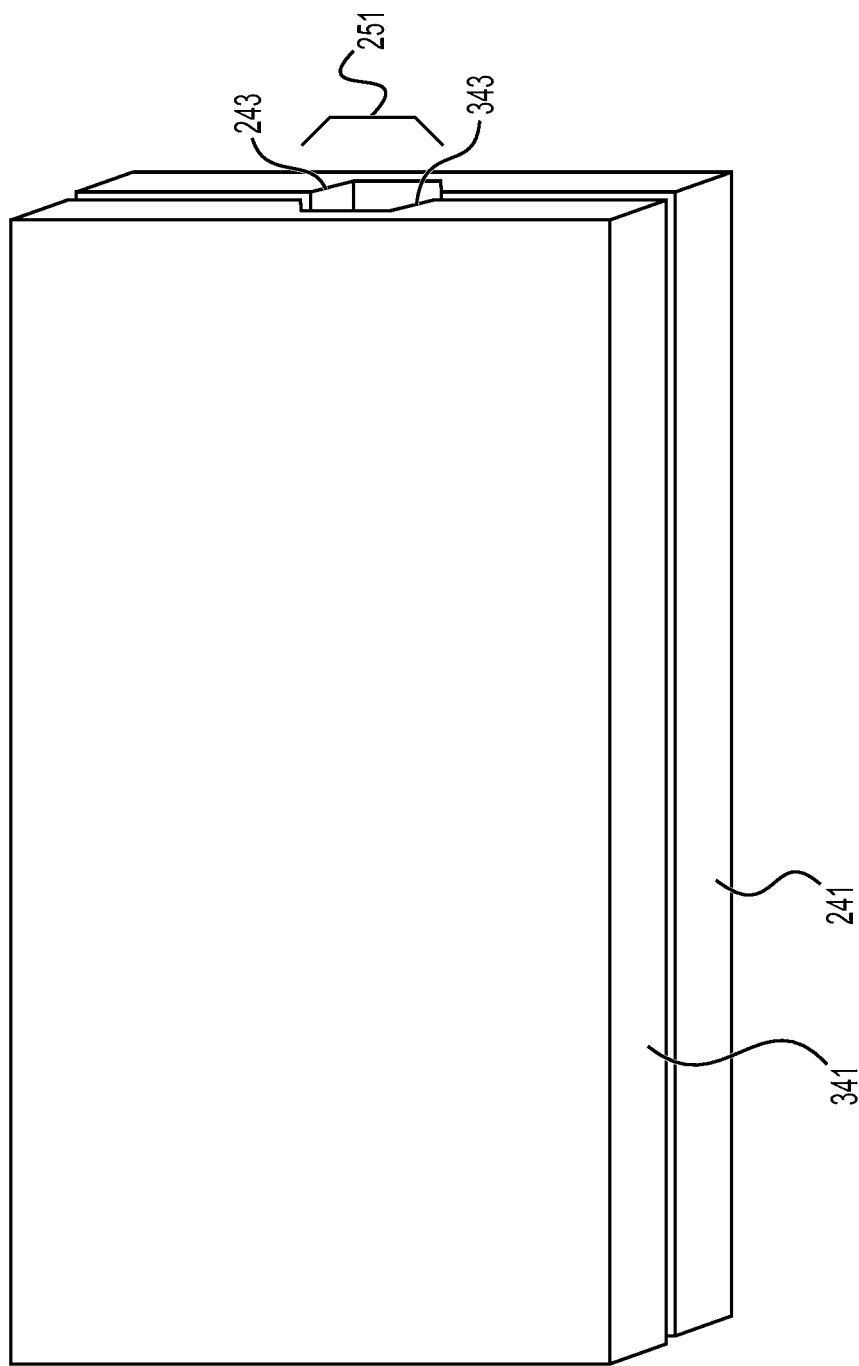
FIG. 3 is a schematic diagram showing the physical arrangement of the Wheatstone bridge of FIG. 1, showing a top cap substrate and a top cap channel.

FIG. 3 is a schematic diagram showing the physical arrangement of the Wheatstone bridge of FIG. 1, showing a top cap substrate and a top cap channel. Top cap 341 and top cap flow channel 343 are fitted above base substrate 241, such that top cap flow channel 343 aligns with flow channel 243 to establish fluid flow path 251 as a fluid passageway.

The resulting structure is that of base substrate 241, shown in FIG. 2, and covered as shown in FIG. 3. Referring back to FIG. 2, two of the resistors 102, 103 are placed in flow channel 243 etched into base substrate 241 with flow inlet and outlet the opposite sides of flow channel 243. Resistors 102, 103 are placed far apart from each other, so that heat generated by these resistors 102, 103 are significantly affected by fluid flow through flow channel 243. While relief cavities 251, 254 are depicted as formed in base substrate 241, it is alternatively possible to form relief cavities 251, 254 in top cap 341 or in both base substrate 241 and top cap 341.

The other two Wheatstone bridge resistors 101, 104 are formed in base substrate 241, as isolated membrane structures, and they are enclosed in the respective relief cavities 251, 254. Relief cavities 251, 254 are large enough to allow heat from resistors 101, 104 to dissipate.

As described above, resistors 101, 102, 103, 104 have positive and negative temperature coefficients (TC) where two resistors 101, 103 in Wheatstone bridge circuit 108 have positive temperature coefficients (PTC) resistances, and the other two resistors 102, 104 have negative temperature coefficients (NTC) resistances. In this configuration resistor 101 (PTC) is connected in series with resistor 102 (NTC). Similarly, on the other side of the bridge, resistor 103 (PTC) is connected in series with resistor 104 (NTC).

A voltage reference is connected to power the Wheatstone bridge 108, which also results in directly heating resistors 101, 102, 103, 104. The physical layout configuration consists of cavities formed as relief cavities 251, 254 in the substrate. Wheatstone bridge resistance structures can be placed on flow channel 243; i.e., resistors 102, 103, and resistors 101, 104 in relief cavities 251, 254 to achieve the low thermal mass properties. This configuration enables high temperature operation and reduces the heat loss through base substrate 241 to maximize the bridge sensitivity to fluid flow and achieve low power operation of the Wheatstone bridge circuit 108.

Based on the depicted schematic and the physical layout of the cavities formed as relief cavities 251, 254 in the substrate structures, resistors 102, 104 will operate in the same way as resistors 103 and 104 at the moment of power up. This holds true if the volumes of relief cavities 251, 254 are sufficiently large to maintain the thermal isolation. As fluid flows through flow channel 243, an isothermally induced heat bubble around NTC resistor 102 moves away, hence decreasing the temperature of resistor 102. This increases the resistance value of resistor 102, hence, increasing its value which causes voltage 131 to increase. On the other hand, the induced heat bubble around PTC resistor 103 moves away. This decreases the resistance of resistor 103 as a result of decreased temperature of resistor. This increases its resistance value, which, in turn, causes voltage 132 to decrease. It is noted that resistors 102 and 103 are positioned far apart such that they don't have any significant thermal interaction with each other. On the other hand, the structures 101 and 104 are thermally isolated in relief cavities 251, 254, and they have no interaction with the fluid flow. Hence, the voltage difference voltage 131-132 has been significantly enhanced by this circuit and physical layout configuration.

If fluid flow, indicated by arrow 255, follows this sequence, the fluid would pass, in sequence, NTC resistor 102 and PTC resistor 103. A corresponding, but opposite sequence occurs for flow in the opposite direction (103 to 102). The fluid is heated by resistors 102 and 103 in the direction shown in FIG. 2.

The result of the flow is that, in a static condition, the heating of PTC resistor 101 and NTC resistor 104, is (ideally) equal. Likewise the reduced heating of PTC resistor 102 and NTC resistor 103 is (ideally) equal. If flow is increased, the upstream resistor 102 is cooled, whereas the heating of the fluid increases the heating of downstream resistor 103. In this arrangement, the sensing of flow using Wheatstone bridge 108 can be made by sensing the difference between sense taps 131, 132. Measurement output circuit 261 provides an indication of flow output based on the sensed difference between sense taps 131, 132.

While resistors 101-104 are described, it is possible to provide alternate impedances in the Wheatstone bridge circuit, in order to provide desired fluid flow measurement characteristics or to provide adjustments in the fluid flow measurement characteristics of the flowmeter. While resistors 101 and 103 are described as PTC resistors at the Vref end of Wheatstone bridge 108 and resistors 102 and 104 are described as NTC resistors at GND end of Wheatstone bridge 108, it is possible to reverse that configuration. Likewise it is possible to use either configuration to measure fluid flow in a direction opposite of the direction indicated by arrow 255.

In one non-limiting configuration, the coefficients of resistance of the NTC resistors substantially match in complement to the coefficients of resistance of the PTC resistors, such that a change in temperature results in equal-but-opposite changes in resistance between the NTC and PTC resistors. It is alternatively possible to provide, as the resistors in relief cavities 251, 254, resistors that have neutral temperature coefficient of resistance characteristics, and rely on the change in resistance of the resistors in flow channel 243.

It is also possible to provide relief cavities 251, 254 as open to outside air or fluid or to mount resistors 101 and 104 externally with or without relief cavities 251, 254 so as to not be in thermal communication with resistors 102 and 103.

In an additional design configuration, the coefficients of all four heating resistors can be all NTC type resistors. However, the layout and the electrical connectivity of the described four NTC resistances will be reconfigured in order to achieve the functionality of the above described NTC and PTC resistor pairs; however, the overall sensor sensitivity might be affected.

In a further additional design configuration, the coefficients of all four heating resistors can be all PTC type resistors. However, the layout and the electrical connectivity of the described four PTC resistances can be reconfigured in order to achieve the functionality of the above described NTC and PTC resistor pairs; however, the overall sensor sensitivity might be affected.

Closing Statement

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A Wheatstone bridge flowmeter comprising:
   a base substrate;
   a flow channel on a top surface of the base substrate;
   a top cap, the top cap fitted to the base substrate to provide a closed flow channel on the top surface of the base substrate to form a fluid passageway;
   a plurality of at least four resistors mounted on the base substrate and connected as a Wheatstone bridge circuit, each of the plurality of at least four resistors having predetermined temperature coefficients of resistance, at least two of said at least four resistors mounted on the base substrate across the flow channel or in thermal proximity to the flow channel;
   at least two of said at least four resistors mounted in substantial thermal isolation from the flow channel; at least one cavity space on at least one of the top surface of the base substrate and the top cap; said at least two of said at least four resistors mounted in substantial thermal isolation from the flow channel mounted in said at least one cavity space; and
   an output circuit sensing voltages across the Wheatstone bridge circuit to provide an output corresponding to fluid flow through the fluid passageway, whereby fluid flowing through the fluid passageway establishes thermal communication with said at least two of said at least four resistors mounted on the base substrate across the flow channel or in thermal proximity to the flow channel, thereby changing the output sensing voltages across the Wheatstone bridge according to fluid flow through the flow channel.

2. The Wheatstone bridge flowmeter of claim 1, further comprising: said at least two of said at least four resistors mounted on the base substrate across the flow channel or in thermal proximity to the flow channel comprising at least one negative temperature coefficient of resistance (NTC) resistor and at least one positive temperature coefficient of resistance (PTC) resistor; and said at least two of said at least four resistors mounted on the base substrate in said at least one cavity space comprising at least one negative temperature coefficient of resistance (NTC) resistor and at least one positive temperature coefficient of resistance (PTC) resistor.

3. The Wheatstone bridge flowmeter of claim 1, further comprising: said at least two of said at least four resistors mounted on the base substrate across the flow channel or in thermal proximity to the flow channel comprising at least one negative temperature coefficient of resistance (NTC) resistor and at least one positive temperature coefficient of resistance (PTC) resistor; and said at least two of said at least four resistors mounted on the base substrate in said at least one cavity space comprising one negative temperature coefficient of resistance (NTC) resistor and one positive temperature coefficient of resistance (PTC) resistor, wherein the coefficients of resistance of the NTC resistors substantially match in complement to the coefficients of resistance of the PTC resistors, such that a change in temperature results in equal-but-opposite changes in resistance between the NTC and PTC resistors.

4. The Wheatstone bridge flowmeter of claim 1, further comprising an orifice of a predetermined size in a flow path of the fluid passageway.

5. The Wheatstone bridge flowmeter of claim 1, wherein the plurality of at least four resistors have an arrangement in the Wheatstone bridge such that resistors on a first side of the Wheatstone bridge exhibit a first type of coefficient of resistance selected from a Positive Temperature Coefficient of resistance (PTC) and a Negative Temperature Coefficient of resistance (NTC), and resistors on a second side of the Wheatstone bridge exhibit a second type of coefficient of resistance selected from PTC and NTC; and the resistors on the first side and the resistors on the second side of the Wheatstone bridge have positions in series connections in the Wheatstone bridge that establish both of one PTC or NTC type resistors at one voltage end of the Wheatstone bridge and both of the other PTC or NTC type resistors at an opposite voltage end of the Wheatstone bridge.

6. A method of measuring fluid flow with a Wheatstone bridge, the method comprising:

providing a base substrate with a fluid passageway comprising a flow channel on a top surface of the base substrate over or through the top surface of the base substrate and a top cap fitted to the base substrate; wherein the top cap comprises a flow channel and wherein the flow channel on the top surface of the base substrate and the flow channel of the top cap align to form the fluid passageway;

providing at least four resistors in a Wheatstone bridge circuit on the base substrate, with at least two of the at least four resistors being in thermal communication with the fluid passageway, the at least four resistors having predetermined temperature coefficients of resistance, at least two of said at least four resistors mounted on the base substrate across the flow channel of the base substrate or in thermal proximity to the flow channel of the base substrate;

providing at least two of the at least four resistors in the Wheatstone bridge circuit in substantial thermal isolation from the flow channel of the base substrate; providing at least one cavity space on at least one of the top surface of the base substrate and the top cap; mounting the at least two of said at least four resistors in substantial thermal isolation from the flow channel of the base substrate mounted in said at least one cavity space; and sensing voltages across the Wheatstone bridge to provide an output corresponding to fluid flow through the fluid passageway, whereby fluid flowing through the fluid passageway establishes thermal communication with said at least two of said at least four resistors mounted on the base substrate across the flow channel of the base substrate or in thermal proximity to the flow channel of the base substrate, thereby changing the output sensing voltages across the Wheatstone bridge according to fluid flow through the flow channel of the base substrate.

7. The method of claim 6, further comprising: providing the resistors in thermal communication with the fluid passageway as one negative temperature coefficient of resistance (NTC) resistor and one positive temperature coefficient of resistance (PTC) resistor; and providing the resistors in the Wheatstone bridge circuit in said at least one cavity space as at least one negative temperature coefficient of resistance (NTC) resistor and at least one positive temperature coefficient of resistance (PTC) resistor.

8. The method of claim 6, further comprising: providing the resistors in thermal communication with the fluid passageway as one negative temperature coefficient of resistance (NTC) resistor and one positive temperature coefficient of resistance (PTC) resistor; and providing the resistors in the Wheatstone bridge circuit in said at least one cavity space as at least one negative temperature coefficient of resistance (NTC) resistor and at least one positive temperature coefficient of resistance (PTC) resistor, wherein the coefficients of resistance of the NTC resistors substantially match in complement to the coefficients of resistance of the PTC resistors, such that a change in temperature results in equal-but-opposite changes in resistance between the NTC and PTC resistors.

9. The method of claim 6, further comprising controlling fluid flow through the fluid passageway by providing an orifice of a predetermined size in a flow path of the fluid passageway.

10. The method of claim 6, further comprising:

arranging the at least four resistors in the Wheatstone bridge circuit such that resistors on a first side of the Wheatstone bridge exhibit a first type of coefficient of resistance selected from a Positive Temperature Coefficient of resistance (PTC) and a Negative Temperature Coefficient of resistance (NTC), and resistors on a second side of the Wheatstone bridge exhibit a second type of coefficient of resistance selected from PTC and NTC; and providing the resistors on the first side and the resistors on the second side of the Wheatstone bridge at positions in series connections in the Wheatstone bridge that establish both of one PTC or NTC type resistors at one voltage end of the Wheatstone bridge and both of the other PTC or NTC type resistors at an opposite voltage end of the Wheatstone bridge.

\* \* \* \* \*